(12) United States Patent
Bird et al.

(10) Patent No.: US 8,752,028 B2
(45) Date of Patent: *Jun. 10, 2014

(54) EFFICIENT MONITORING IN A SOFTWARE SYSTEM

(71) Applicant: International Business Machines Corporation, Armonk, NY (US)

(72) Inventors: Paul M Bird, Markham (CA); David Kalmuk, Toronto (CA); Scott D Walkty, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,710

(22) Filed: Feb. 22, 2013

(65) Prior Publication Data

US 2013/0166741 A1    Jun. 27, 2013

Related U.S. Application Data

(63) Continuation of application No. 12/648,434, filed on Dec. 29, 2009.

(51) Int. Cl.
*G06F 9/44* (2006.01)

(52) U.S. Cl.
USPC ............ 717/130; 717/127; 717/128; 718/100

(58) Field of Classification Search
None
See application file for complete search history.

(56) References Cited

U.S. PATENT DOCUMENTS

| | | | |
|---|---|---|---|
| 6,728,955 B1 * | 4/2004 | Berry et al. | 717/158 |
| 6,735,758 B1 * | 5/2004 | Berry et al. | 717/130 |
| 7,162,390 B2 | 1/2007 | Jowett et al. | |
| 7,260,692 B1 * | 8/2007 | Zahavi et al. | 711/154 |
| 7,389,497 B1 * | 6/2008 | Edmark et al. | 717/130 |
| 7,426,731 B2 * | 9/2008 | Findeisen | 718/104 |
| 7,770,163 B2 * | 8/2010 | Stoodley et al. | 717/158 |
| 2004/0148594 A1 * | 7/2004 | Williams | 717/158 |
| 2004/0158589 A1 * | 8/2004 | Liang et al. | 707/206 |
| 2004/0225443 A1 * | 11/2004 | Kamps | 702/14 |
| 2004/0255290 A1 * | 12/2004 | Bates et al. | 717/174 |
| 2005/0060521 A1 * | 3/2005 | Wang | 712/227 |
| 2005/0155019 A1 * | 7/2005 | Levine et al. | 717/127 |
| 2005/0223366 A1 * | 10/2005 | Smith et al. | 717/128 |
| 2007/0277056 A1 * | 11/2007 | Varadarajan et al. | 714/15 |
| 2008/0109817 A1 * | 5/2008 | Nakamura | 718/105 |
| 2009/0049428 A1 * | 2/2009 | Cozmei | 717/128 |
| 2009/0077005 A1 | 3/2009 | Yung et al. | |
| 2010/0153634 A1 * | 6/2010 | Fellinger et al. | 711/104 |
| 2010/0223598 A1 * | 9/2010 | Levine et al. | 717/128 |

* cited by examiner

*Primary Examiner* — Emerson Puente
*Assistant Examiner* — Hiren Patel
(74) *Attorney, Agent, or Firm* — North Shore Patents, P.C.; Michele Liu Baillie

(57) ABSTRACT

A monitoring of a server system during an execution of a server system processing logic, includes: during collection and storage of operational metrics by a given thread in a thread-local memory, determining that a checkpoint within the server system processing logic is reached; determining whether a threshold number of checkpoints have been encountered by the given thread; in response to the threshold number of checkpoints having been encountered, determining whether a threshold time interval since a last rollup of the collected operational metrics has been exceeded; and in response to the threshold time interval being exceeded, performing a rollup of the collected operational metrics from the thread-local memory to an accumulation point in a shared memory, where the accumulation point stores aggregated operational metrics from a plurality of threads.

7 Claims, 4 Drawing Sheets

EFFICIENT MONITORING IN A SOFTWARE SYSTEM

CROSS-REFERENCE TO RELATED APPLICATIONS

The present application relates to co-pending U.S. patent application Ser. No. 12/648,434, filed on Dec. 29, 2009.

BACKGROUND

Operation system monitoring is a key component of any large scale software system, such as an enterprise database server. In such complex systems, the ability to monitor in-memory operational metrics provides critical diagnostic capabilities that allow administrators to determine whether the system is operating properly, and to help diagnose potential problems in system operation when it is not. Such monitoring capabilities are often complex, involving the collection of numerous metrics by individual execution threads in the system, and the accumulation and reporting of those metrics along various dimensions. For example, in a database server system, monitoring capabilities might provide reporting of accumulated in-memory metrics per connection, per transaction, per statement, per service class, and per database. One challenge in the design and implementation of any such monitoring capability is providing timely operational metrics while keeping the performance impacts on the system low. The desirable characteristics of a monitoring capability includes: low collection overhead, low query overhead, and real time or near-real time operational metrics on the system. In any typical software system, the monitoring capabilities must make tradeoffs in one or more of these categories to achieve advantages in the others.

BRIEF SUMMARY

According to one aspect of the present invention, a method for monitoring a server system during an execution of a server system processing logic includes: during collection and storage of operational metrics by a given thread in a thread-local memory, determining that a checkpoint within the server system processing logic is reached determining whether a threshold number of checkpoints have been encountered by the given thread; in response to the threshold number of checkpoints having been encountered, determining whether a threshold time interval since a last rollup of the collected operational metrics has been exceeded; and in response to the threshold time interval being exceeded, performing a rollup of the collected operational metrics from the thread-local memory to an accumulation point in a shared memory, wherein the accumulation point stores aggregated operational metrics from a plurality of threads.

According to another aspect of the present invention, a computer program product for monitoring a server system during an execution of a server system processing logic, the computer program product includes: a computer readable storage medium having computer readable program code embodied therewith, the computer readable program code comprising: computer readable program code configured to perform the method set forth above.

According to another aspect of the present invention, system includes: a processor; memory operatively coupled to the processor, the memory comprising shared memory and thread-local memories; and a computer readable stored medium operatively coupled to the processor and the memory, the computer readable storage medium having computer readable program code embodied therewith, the computer readable program code comprising computer readable program code configured to perform the method set forth above.

DETAILED DESCRIPTION

Figure 1:
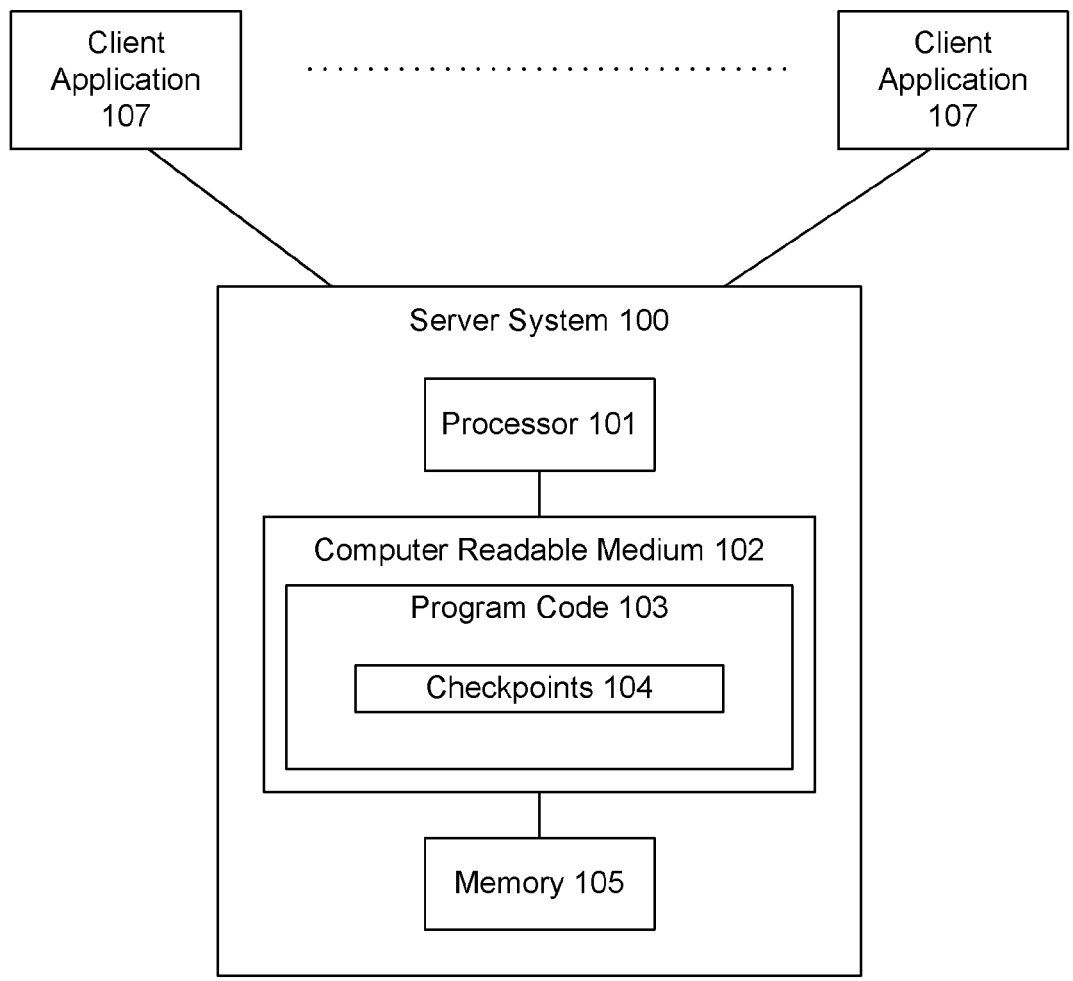
FIG. 1 illustrates an embodiment of a system for monitoring in a server system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for monitoring in a server system. The server system 100 is operatively coupled to a processor 101 and a computer readable medium 102. The computer readable medium 102 stores computer readable program code 103 which includes the core server processing logic. The program code 103 includes checkpoints 104 with the server processing logic, used in the monitoring of the server system 100 according to the various embodiments of the present invention. Checkpoints 104 and the monitoring of the server system 100 are described further below. The server system 100 is further operatively coupled to memory 105, which includes both upper level shared memory structures and thread-local memory structures (not shown). Various client applications 106 communicate with the server system 100 through an established protocol to issue operations on the system 100.

The embodiment of the present invention provides a method for monitoring a server system 100 that minimizes the collection and querying overhead of operational metrics, and provides the operational metrics of the system 100 in near real-time.

Figure 2:
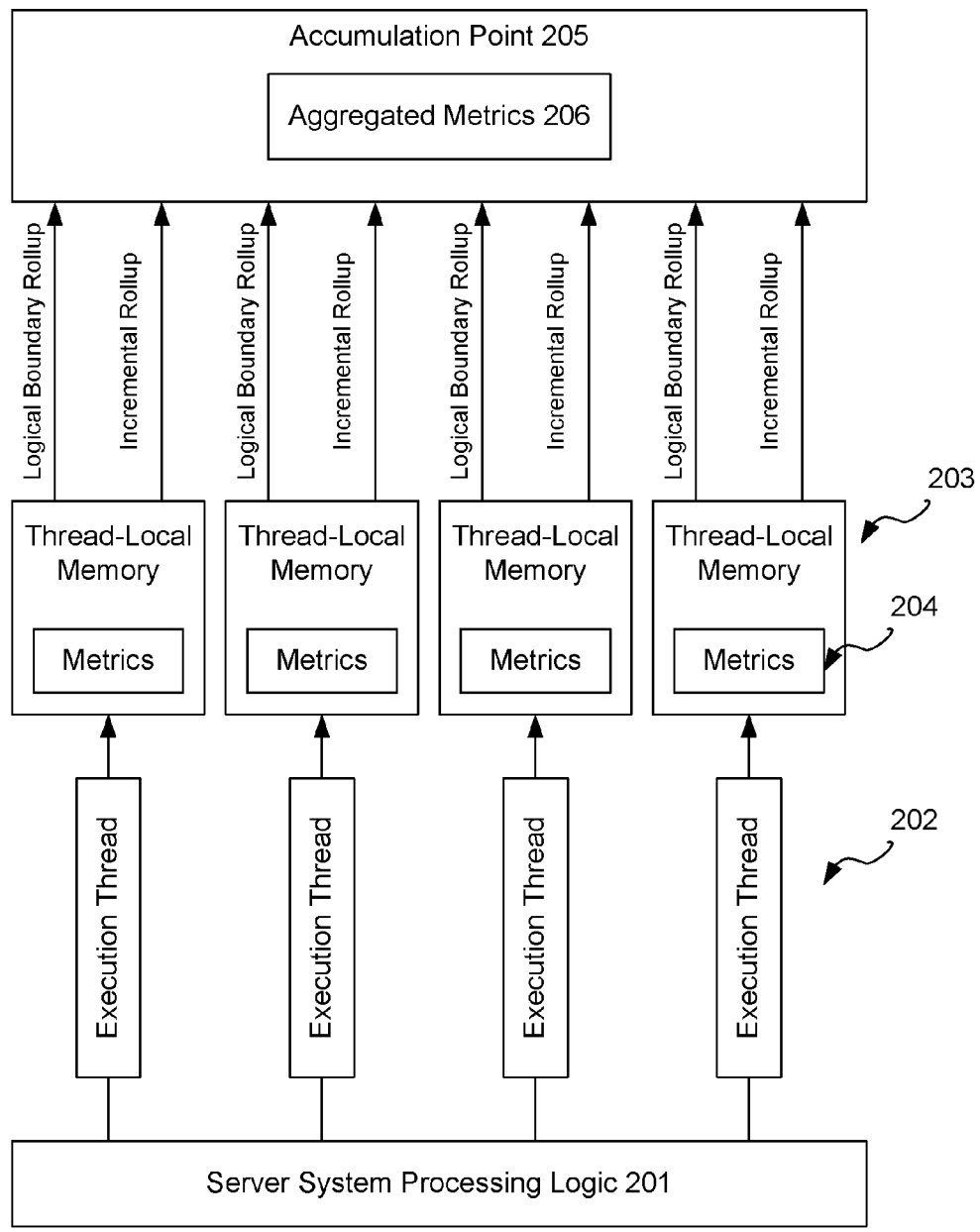
FIG. 2 is a block diagram illustrating conceptually the method for monitoring a server system.

FIG. 2 is a block diagram illustrating conceptually the method for monitoring a server system. The server system processing logic 201 is executed via a plurality of threads 202. Operational metrics 204 are collected individually by the threads 202, minimizing the collection overhead by ensuring no synchronization or redundant operations during collection. Each thread 202 stores the collected operational metrics 204 in a thread-local memory structure 203. The collected operational metrics 204 are then rolled up to a higher level accumulation point 205 in shared memory, where they are aggregated along with metrics collected by other threads and stored as aggregated metrics 206. In this specification, an "accumulation point" is a memory structure in shared memory of the system 100 where operational metrics collected by a plurality of threads are aggregated.

The embodiment rolls up the operational metrics 204 in the thread-local memory 203 into the accumulation point 205 using a combination of two mechanisms: (1) a logical boundary rollup where each thread rolls up or "pushes" collected operational metrics 204 from thread-local memory 203 to the accumulation point 205 at processing boundaries, such as the end of a user request or transaction; and (2) an incremental rollup, where each thread pushes collected operational metrics 204 from thread-local memory 203 to the accumulation point 205 based on a timer.

By performing the logical boundary rollup, the need to drill down to lower level memory to obtain the operational metrics is avoided. There is no need to traverse each thread-local memory structure 203 to accumulate the operational metrics on the fly. Only the accumulation point 205 need be traversed. A drill down would have significant impacts on the system throughput while a query is being performed, and can become a significant impediment if operational metrics are queried on a regular basis.

However, the logical boundary rollup may result in latencies in the availability of operational metrics since the length of a given query can vary greatly from sub-seconds to hours, depending on the complexity of the operation. By performing the incremental rollup in combination with the logical boundary rollup, near real-time operational metrics can be made available even with complex queries, without significantly introducing further performance overhead. For example, for queries which execute within a relatively short amount of time, the incremental rollup is not be triggered during the operation, thus avoiding unnecessary overhead to the runtime of the query. For queries executed over a relatively longer period of time, the incremental rollup will be triggered frequently enough to ensure that operation metrics collected during the query are pushed up regularly to provide near real-time data, but still infrequently enough that the overhead costs have little performance impact.

In an embodiment of the incremental rollup, checkpoints are instrumented throughout the core processing logic 201 of the server system 100, such that a checkpoint is invoked frequently by the server logic 201 during processing. The checkpoint comprises code that checks the time elapsed since the last time the collected operational metrics 204 were rolled up to the accumulation point 205 by a given thread 202. At a given checkpoint, if the time since the last collected metrics rollup exceeds a threshold time interval, the checkpoint code invokes handler logic to roll up collected operational metrics 204 from the thread-local memory 203 to the accumulation point 205. Otherwise, the rollup is not performed. The checkpoints are "lightweight" in that the execution of the checkpoint code has a very small impact on the overall performance of the server system 100 and in that a rollup is not performed at every checkpoint.

Figure 3:
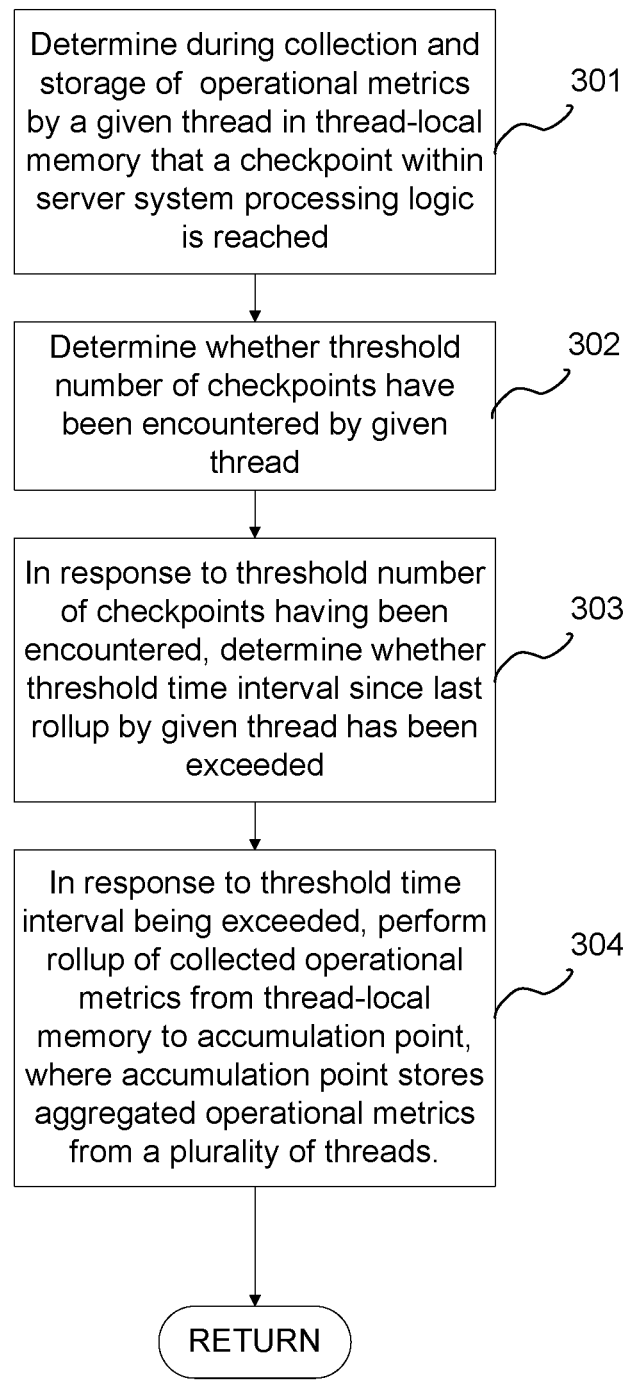
FIG. 3 is a flowchart illustrating an embodiment of a method for incremental rollup of operational metrics.

FIG. 3 is a flowchart illustrating an embodiment of a method for incremental rollup of operational metrics. During the execution of server processing logic 201, a checkpoint within the server processing logic is determined to be reached by a given thread 202 (301). Next, whether a threshold number of checkpoints within the server processing logic 201 has been encountered by a given thread 202 is determined (302). In response to the threshold number of checkpoints having been encountered, whether a threshold time interval since the last operational metrics rollup for the given thread has been exceeded is determined (303). In response to the threshold time interval being exceeded, a rollup of operational metrics 204 from thread-local memory 203 to the accumulation point 205 is performed, where the accumulation point 205 stores aggregated operational metrics 206 from a plurality of threads (step 304).

Since the checkpoints are located within the server system processing logic 201, their locations are controlled. By controlling their locations, there's assurance that the rollup handler will not be triggered when a thread is already in the process of performing a metrics rollup at a logical boundary.

Implementing checkpoints within the server system processing logic 201 avoids the need to rely on an operating system signal as a timer. With an operating system signal, the operation system sends an interrupt signal at certain intervals to the server system processing logic 201. However, when the interrupt signal arrives at the logic 201 cannot be controlled. If the interrupt signal arrives during a critical operation, such as the middle of a rollup, another rollup would be triggered, resulting in a deadlock.

Implementing checkpoints within the server system processing logic 201 also avoids the need to reply on a third party asynchronous time thread. The third party asynchronous thread would wake at certain intervals and perform the operational metrics rollup. However, since the thread is third party and thus external to the system 100, synchronization on the data structures storing operational metrics would be required, resulting in a significant impact on system performance.

Figure 4:
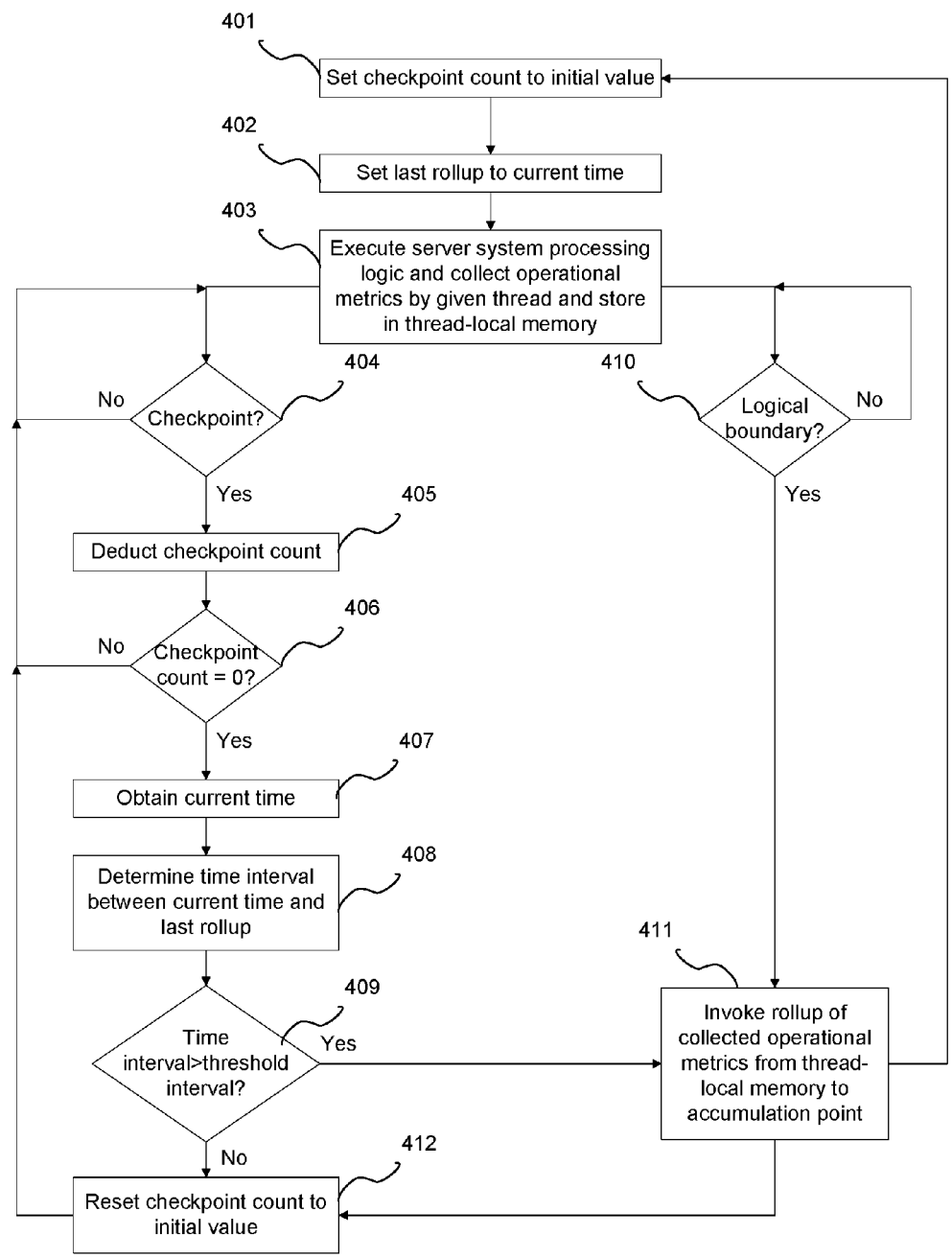
FIG. 4 is a flowchart illustrating in more detail the embodiment of the method for incremental rollup of operational metrics.

FIG. 4 is a flowchart illustrating in more detail the embodiment of the method for incremental rollup of operational metrics. A checkpoint count is set to an initial value (401), and a last rollup is set to the current time (402). During the executing of the server system processing logic 201, operational metrics 204 are collected by a given thread 202 and stored in thread-local memory 203 (403). When a checkpoint is encountered by the given thread (404), the checkpoint count is modified to indicate the encounter. Whether the checkpoint count indicates that the threshold number of checkpoints have been encountered is determined. For example, in one embodiment, the threshold count is initially set to the threshold number of checkpoints. When a checkpoint is encountered by the given thread 202 (404), the checkpoint count is deducted (405), and whether the checkpoint count is equal to zero is determined (406). In response to the checkpoint count being equal to zero, the current time is obtained (407), and the time interval between the current time and the last rollup is determined (408). In response to the time interval exceeding a threshold interval (409), a rollup of collected operational metrics 204 from the thread-local memory 203 to the accumulation point 205 is invoked (411). When the time interval does not exceed the threshold interval, the checkpoint count is reset to the initial value (412), and the collection of operational metrics continues without performing a rollup. When the checkpoint count is not equal to zero (406), or when the time interval between the current time and the last rollup has not exceeded the threshold interval (409), the collection of operational metrics continues without performing a rollup (403). Although FIG. 4 illustrates the checkpoint point count being set to an initial value and decremented when a checkpoint is encountered by the given thread, any manner of determining whether the threshold number of checkpoint shave been encountered can be used without departing from the spirit and scope of the present invention. For example, in an alternative embodiment, the checkpoint count can be initially set to zero, and when a checkpoint is encountered by the given thread 202, the checkpoint count is incremented. Whether the checkpoint count is equal to the threshold number of checkpoints is determined. In response to the checkpoint count being equal to the threshold number of checkpoints, the current time is obtained (407), and the process continues as described above.

Further, when a logical boundary is reached during the processing of the server system logic 201 (410), a rollup is also invoked to rollup collected operational metrics 204 from the thread-local memory 203 to the accumulation point 205 (411).

In one embodiment, once a rollup is performed the checkpoint count is reset to the initial value (401), and the last rollup is set to the current time (402). The collection of operational metrics continues (403), and the process (403-412) repeats. In an alternative embodiment, the checkpoint count is reset only when an incremental rollup is performed.

For example, assume that the checkpoint count is initially set to 100, and the threshold interval is 10 seconds. At every $100^{th}$ checkpoint (404-408), the time interval is checked (407-409). When the time interval exceeds 10 seconds, a rollup is invoked (411). At a logical boundary, a rollup is also invoked (410-411). Otherwise, no rollup is performed.

By combining the incremental rollup with the logical boundary rollup, as set forth above, a desirable balance is realized between collection overhead, query overhead, and the providing of real-time or near real-time operational metrics on the system.

What is claimed is:

1. A method for monitoring a server system during an execution of a server system processing logic, comprising:
    performing an incremental rollup of operational metrics concurrently by each given thread of a plurality of threads, each thread having a corresponding thread-local memory, comprising:
        collect and store the operational metrics by the given thread in the thread-local memory corresponding to the given thread;
        determining that a checkpoint within the server system processing logic is reached by the given thread;
        determining whether a threshold number of checkpoints have been encountered by the given thread;
        in response to the threshold number of checkpoints having been encountered, determining whether a threshold time interval since a last rollup of the collected operational metrics by the given thread to an accumulation point in a memory shared by the plurality of threads has been exceeded; and
        in response to the threshold time interval being exceeded, performing the incremental rollup of the collected operational metrics from the thread-local memory corresponding to the given thread to the accumulation point in the shared memory, wherein the accumulation point stores aggregated operational metrics from the plurality of threads; and
    performing a logical boundary rollup concurrently with the incremental rollup by each given thread of the plurality of threads, comprising:
        determining by the given thread whether a logical boundary during the execution of the server system processing logic by the given thread has been reached; and
        in response to the logical boundary during the execution of the server system processing logic being reached, invoking the logical boundary rollup of the collected operational metrics from the thread-local memory corresponding to the given thread to the accumulation point.

2. The method of claim 1, wherein the performing of the incremental rollup of the operational metrics concurrently by each given thread of the plurality of threads comprises:
    prior to performing the incremental rollup and the logical boundary rollup by the given thread:
        setting a checkpoint count for the given thread to an initial value; and
        setting a last rollup for the given thread to a current time.

3. The method of claim 2, wherein the determining whether the threshold number of checkpoints have been encountered by the given thread comprises:
    modifying the checkpoint count to indicate that the checkpoint has been reached; and
    determining whether the checkpoint count indicates that the threshold number of checkpoints have been encountered by the given thread.

4. The method of claim 3, wherein the determining whether the threshold time interval since the last rollup of the collected operational metrics by the given thread has been exceeded comprises:
    obtaining a current time;
    determining a time interval between the current time and the last rollup of the collected operational metrics by the given thread; and
    determining if the time interval exceeds the threshold time interval.

5. The method of claim 4, wherein the performing the rollup of the collected operational metrics from the thread-local memory corresponding to the given thread to the accumulation point in the shared memory comprises:
    determining that the time interval exceeds the threshold time interval;
    in response to determining that the time interval exceeds the threshold time interval, invoking a rollup of the collected operational metrics from the thread-local memory corresponding to the given thread to the accumulation point.

6. The method of claim 1, further comprising:
    in response to either performing the incremental rollup or the logical boundary rollup by the given thread;
    resetting the checkpoint count for the given thread to the initial value;
    setting the last rollup for the given thread to the current time; and
    repeating performance of the incremental rollup concurrently with the performance of the logical boundary rollup by the given thread.

7. The method of claim 1, further comprising:
    in response to the threshold time interval not being exceeded, resetting the checkpoint count for the given thread to the initial value and repeat performance of the incremental rollup concurrently with the performance of the logical boundary rollup by the given thread.

* * * * *